(12) United States Patent
Kwon et al.

(10) Patent No.: US 8,945,744 B2
(45) Date of Patent: Feb. 3, 2015

(54) ELECTRODE ASSEMBLY HAVING STEPPED PORTION, AS WELL AS BATTERY CELL, BATTERY PACK, AND DEVICE INCLUDING THE ELECTRODE ASSEMBLY

(71) Applicant: LG Chem, Ltd., Seoul (KR)

(72) Inventors: Sung-Jin Kwon, Daejeon (KR);
Young-Hoon Kim, Daejeon (KR);
Soon-Ho Ahn, Daejeon (KR);
Dong-Myung Kim, Daejeon (KR);
Ki-Woong Kim, Daejeon (KR);
Sung-Han Yoon, Daejeon (KR);
Seung-Min Ryu, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/104,226

(22) Filed: Dec. 12, 2013

(65) Prior Publication Data

US 2014/0099525 A1    Apr. 10, 2014

Related U.S. Application Data

(63) Continuation of application No. PCT/KR2013/004619, filed on May 27, 2013.

(30) Foreign Application Priority Data

May 25, 2012 (KR) .......................... 10-2012-0056327
Nov. 9, 2012 (KR) .......................... 10-2012-0127031
May 27, 2013 (KR) .......................... 10-2013-0069031

(51) Int. Cl.
*H01M 10/02* (2006.01)
*H01M 10/04* (2006.01)
(Continued)

(52) U.S. Cl.
CPC ........ *H01M 10/0431* (2013.01); *H01M 2/0207* (2013.01); *H01M 2/14* (2013.01); *H01M 10/04* (2013.01)

USPC ............. 429/94; 429/149; 429/152; 429/176; 180/65.1; 180/65.21

(58) Field of Classification Search
USPC ........... 429/94, 149, 163, 127, 241, 152, 144, 429/153, 176; 29/623.1, 623.5; 219/200
See application file for complete search history.

(56) References Cited

U.S. PATENT DOCUMENTS 3,375,135 A * 3/1968 Moulton et al. ................ 429/50
4,204,036 A * 5/1980 Cohen et al. .................. 429/152
(Continued)

FOREIGN PATENT DOCUMENTS

CN      101405911 A    4/2009
JP      2001-167743 A  6/2001
(Continued)

OTHER PUBLICATIONS

International Search Report for PCT/KR2013/004619 mailed Sep. 26, 2013.
(Continued)

*Primary Examiner* — Kenneth Douyette
(74) *Attorney, Agent, or Firm* — Lerner, David, Littenberg, Krumholz & Mentlik, LLP

(57) ABSTRACT

There is provided an electrode assembly. The electrode assembly includes a stack of unit cells respectively including at least one negative electrode and at least one positive electrode, alternately stacked, wherein at least one separator is placed on each of both sides of the electrodes, and at least one of the unit cells has an area different from that of an adjacent unit cell to form at least one stepped portion on the electrode assembly. In addition, there are also provided a battery cell, a battery pack, and a device that include the electrode assembly.

26 Claims, 14 Drawing Sheets

1

(51) Int. Cl.
*H01M 2/02* (2006.01)
*B60R 16/02* (2006.01)
*H01M 2/14* (2006.01)

(56) References Cited

U.S. PATENT DOCUMENTS

| | | | |
|---|---|---|---|
| 6,224,995 | B1 | 5/2001 | Fauteux et al. |
| 7,629,077 | B2 | 12/2009 | Bowles et al. |
| 2001/0005561 | A1 | 6/2001 | Yamada et al. |
| 2002/0146625 | A1* | 10/2002 | Probst ............... 429/241 |
| 2004/0172808 | A1 | 9/2004 | Fraser et al. |
| 2006/0062904 | A1 | 3/2006 | West et al. |
| 2007/0059599 | A1 | 3/2007 | Rubino et al. |
| 2007/0218355 | A1 | 9/2007 | Ryu et al. |
| 2009/0136834 | A1* | 5/2009 | Coowar et al. ........ 429/127 |
| 2009/0159582 | A1* | 6/2009 | Chami et al. ......... 219/200 |
| 2010/0190081 | A1 | 7/2010 | Park et al. |
| 2011/0183183 | A1 | 7/2011 | Grady et al. |
| 2012/0015236 | A1 | 1/2012 | Spare |
| 2012/0110836 | A1 | 5/2012 | Oh et al. |
| 2012/0177975 | A1* | 7/2012 | Yageta et al. ........ 429/144 |
| 2013/0266841 | A1 | 10/2013 | Ryu et al. |

FOREIGN PATENT DOCUMENTS

| | | | |
|---|---|---|---|
| KR | 10-2003-0066960 A | | 8/2003 |
| KR | 10-2008-0030700 A | | 4/2008 |
| KR | 10-2008-0099890 A | | 11/2008 |
| KR | 10-2010-0118173 A | | 11/2010 |
| KR | 10-2012-0039469 A | | 4/2012 |
| WO | WO-2011/030377 A1 * | 3/2011 | ........... H01M 10/40 |

OTHER PUBLICATIONS

Chinese Office Action dated Aug. 5, 2014.
Supplementary European Search Report and European Search Opinion, dated Dec. 2, 2014.

\* cited by examiner

ELECTRODE ASSEMBLY HAVING STEPPED PORTION, AS WELL AS BATTERY CELL, BATTERY PACK, AND DEVICE INCLUDING THE ELECTRODE ASSEMBLY

CROSS-REFERENCE TO RELATED APPLICATIONS

This application is a continuation of PCT/KR2013/004619, filed on May 27, 2013, which claims the priorities of Korean Patent Application Nos. 10-2012-0056327 filed on May 25, 2012, 10-2012-0127031 filed on Nov. 9, 2012, and 10-2013-0069031 filed on May 27, 2013, in the Korean Intellectual Property Office the disclosures of which are incorporated herein by reference.

BACKGROUND OF THE INVENTION

1. Field of the Invention

The present invention relates to an electrode assembly, as well as a battery cell, a battery pack, and a device including the electrode assembly, and more particularly, to an electrode assembly formed by stacking at least two unit cells having different sizes to form a stepped portion on the electrode assembly, and a battery cell, a battery pack, and a device including the electrode assembly.

2. Description of the Related Art

Demand for secondary batteries has markedly increased with the development and increasing usage of mobile devices, and particularly, lithium secondary batteries are widely being used as power sources in various electronic products such as mobile devices, owing to the high energy density, high operating voltages, easy-to-store characteristics, and relatively long lifespan thereof.

Generally, lithium secondary batteries are formed by disposing an electrode assembly and an electrolyte within a battery case and sealing the battery case. Lithium secondary batteries may be classified into cylindrical, prismatic, and pouch type batteries, according to the shape thereof, and lithium ion batteries, lithium ion polymer batteries, and lithium polymer batteries, according to the type of electrolyte used therein.

Demand for thin prism or pouch type batteries has increased as the size of mobile devices has decreased, and particularly, pouch type batteries are noteworthy, as pouch type batteries are relatively light and can be easily deformed to have desired shapes and be manufactured at low cost.

Recent mobile devices are relatively small and have various shapes. Due to these technical trends, batteries in which the same battery unit cells are stacked may be unsuitable for such mobile devices because it may be difficult to match the shapes of such batteries and mobile devices without any dead space therein. Therefore, it is necessary to develop batteries having various shapes for mobile devices.

Accordingly, there is increasing demand for batteries having stepped shapes. If batteries are shaped (stepped) according to the shapes of devices in which the batteries will be accommodated, dead space can be minimized to efficiently use the interior space of devices. In other words, the capacity of batteries can be increased by designing the batteries having stepped shapes.

That is, it is necessary to develop electrode assemblies and batteries that have high degrees of capacitance and can be variously shaped according to the shapes of devices to which the batteries will be attached.

An aspect of the present invention provides an electrode assembly having satisfactory electric capacity characteristics, a slim shape, and structural merits, to allow for the realization of various designs.

Aspects of the present invention also provide a battery cell, a battery pack, and a device including the electrode assembly.

SUMMARY OF THE INVENTION

According to an aspect of the present invention, there is provided an electrode assembly having a stepped portion. The electrode assembly may include a stack of unit cells respectively including at least one negative electrode and at least one positive electrode, alternately stacked, wherein at least one separator is placed on each of both sides of the electrodes, and at least one of the unit cells has an area different from that of an adjacent unit cell to form at least one stepped portion on the electrode assembly.

For example, one or two stepped portions may be formed on the electrode assembly.

In the aspect of the present invention, the electrode assembly may further include at least one single electrode having negative or positive polarity. The single electrode may be placed on an upper side or a lower side of the electrode assembly in a stacking direction of the unit cells, and the single electrode may form a stepped portion together with an adjacent unit cell.

In certain embodiments of the invention, the unit cells may include at least one of a stacked/folded type unit cell, a jelly-roll type unit cell, a laminated and stacked type unit cell, and a combination thereof, and the electrode assembly may further include at least one single electrode having negative or positive polarity.

At least one negative electrode; at least one positive electrode; and a unit cell in which at least one positive electrode and at least one negative electrode are stacked with a separator interposed therebetween may be arranged on at least one rectangular separator, and the stacked/folded type unit cell may be formed by folding the at least one rectangular separator.

The stacked/folded type unit cell, the jelly-roll type unit cell, the laminated and stacked type unit cell, or a combination thereof may include at least one stepped portion.

In the aspect of the present invention, the at least one of the unit cells and the unit cell adjacent thereto may have mutually-facing electrodes, and one of the mutually-facing electrodes having a relatively large area may be a negative electrode.

In other embodiments, the negative electrode may include a negative electrode collector having one side or both sides thereof coated with a negative electrode active material, and the positive electrode may include a positive electrode collector having one side or both sides thereof coated with a positive electrode active material, wherein the area of the negative electrode collector coated with the negative electrode active material may be equal to or greater than the area of the positive electrode collector coated with the positive electrode active material.

In addition, at least one of electrodes located on upper and lower sides of the electrode assembly in a stacking direction of the unit cells may be a negative electrode or a positive electrode. At this time, the positive electrode may be a single-side-coated positive electrode, and a non-coated side of the single-side-coated positive electrode may face outwards. In the aspect of the invention, the negative and positive electrodes may include electrode tabs, respectively, and electrode tabs having the same polarity may be electrically connected to each other.

The electrode tabs of the negative and positive electrodes may be attached to the same sides of the electrodes so that the electrode tabs can protrude from the same side of the electrode assembly, or the electrode tabs may be attached to different sides of the electrodes so that the electrode tabs can protrude from the different sides of the electrode assembly. At this time, electrode tabs having the same polarity may be attached to the same sides of the electrodes.

The electrode tabs may have the same size or different sizes.

In certain embodiments, at least one of the unit cells may have a corner shaped differently from the other corners thereof.

For example, the at least one of the unit cells may have at least one curved corner, or the least one of the unit cells may have two or more curved corners. In the later case, the curved corners may have the same curvature or different curvatures.

In another example, each of two or more of the unit cells may have at least one curved corner, and at least one of the curved corners may have a curvature different from that of the other curved corners.

In certain embodiments, at least one of neighboring electrodes of the electrode assembly may be disposed on an adjacent electrode thereof within a boundary of the neighboring electrode.

For example, areas of the unit cells may decrease in a stacking direction of the unit cells, and the unit cells may be stacked in a manner such that corners of the unit cells are aligned in a line or centers of the unit cells are aligned in a line.

In certain embodiments, the unit cells may have the same thickness or different thicknesses.

According to another aspect of the present invention, there is provided a battery cell including: the electrode assembly; and a battery case accommodating the electrode assembly. The battery case may be a pouch type case. The battery case may have a stepped or inclined portion corresponding to the shape of the electrode assembly.

The battery cell may be a lithium ion secondary battery cell or a lithium ion polymer secondary battery cell.

According to another aspect of the present invention, there is provided a device including the battery cell or a plurality of such battery cells. A system component of the device may be disposed in a remaining space of the battery cell. The device may be a cellular phone, a portable computer, a smartphone, a smartpad, a net book, a light electronic vehicle (LEV), an electric vehicle, a hybrid electric vehicle, a plug-in hybrid electric vehicle, or a power storage device.

According to an aspect of the present invention, electrode assemblies having various shapes can be provided to effectively deal with rapidly changing technical trends in mobile devices and to realize various battery designs.

According to another aspect of the present invention, mobile devices can have less dead space caused by battery design and thus have spatial efficiency. In addition, the capacities of battery cells can be increased.

According to another aspect of the present invention, different types of electrodes can face each other in the interfacial regions between unit cells of an electrode assembly having different sizes. Therefore, an electrochemical reaction can occur in the interfacial regions to increase the output power of a battery.

DETAILED DESCRIPTION OF THE INVENTION

Figure 1:
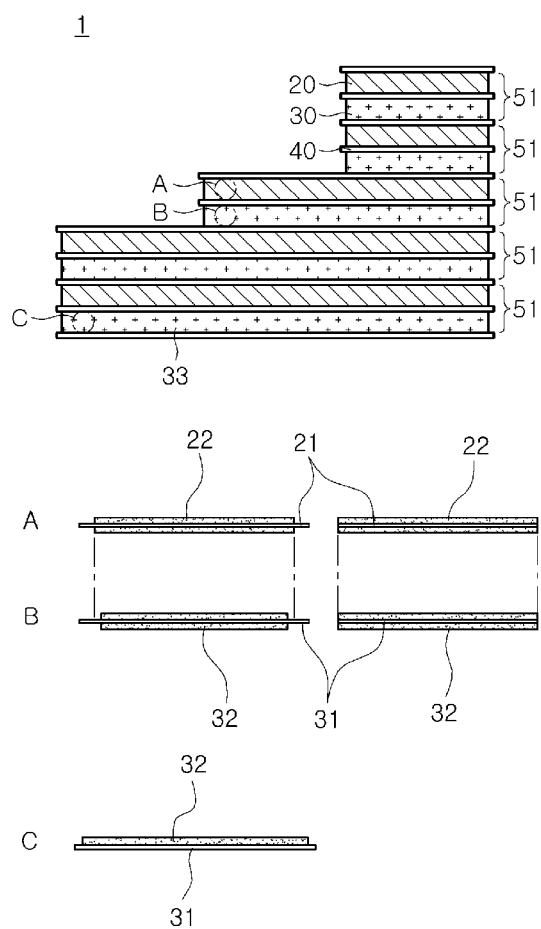
FIG. 1 is a schematic sectional view illustrating an electrode assembly in which stacked type unit cells are stacked in a stepped manner so that the electrode assembly can have stepped portions, according to an embodiment of the invention.

Hereinafter, embodiments of the invention will be described in detail with reference to the accompanying drawings. The drawings are attached hereto to help explain exemplary embodiments of the invention, and the present invention is not limited to the drawings and embodiments. In the drawings, some elements may be exaggerated, reduced in size, or omitted for clarity or conciseness.

In embodiments of the invention, an electrode assembly may be formed by stacking a plurality of unit cells. In the unit cells, positive and negative electrodes are alternately stacked, and at least one separator is disposed on each of both sides of the electrodes. That is, a separator may be disposed between positive and negative electrodes, and an electrode having one side on which no other electrode is disposed, such as the outermost electrodes of the electrode assembly, may be covered with a separator. In the following explanation, although descriptions of separators are not given, separators may be disposed on both sides of electrodes unless otherwise specified.

Materials that can be used for forming the negative and positive electrodes and separators of the unit cells are not limited to particular materials. For example, any materials generally used for forming negative and positive electrodes and separators may also be used in the embodiments of the invention.

For example, the negative electrodes may be fabricated by making a negative electrode collector using copper (Cu), nickel (Ni), aluminum (Al), or at least one combination thereof and coating one side or both sides of the negative electrode collector with at least one negative electrode active material selected from lithium, a lithium alloy, carbon, petroleum coke, active carbon, graphite, a silicon compound, a zinc compound, a titanium compound, and alloys or combinations thereof. However, the present invention is not limited thereto.

For example, the positive electrodes may be fabricated by making a positive electrode collector using aluminum (Al), nickel (Ni), copper (Cu), or a combination thereof and coating one side or both sides of the positive electrode collector with a positive electrode active material such as a lithium manganese oxide, a lithium cobalt oxide, a lithium nickel oxide, a lithium iron phosphate, or a combination or complex oxide thereof.

Referring to FIG. 1, in unit cells having the same size, negative and positive electrode collectors 21 and 31 have the same size. The entire surfaces of the negative and positive electrode collectors 21 and 31 may be coated with negative and positive electrode active materials 22 and 32, or edge regions of the negative and positive electrode collectors 21 and 31 may not be coated with the negative and positive electrode active materials 22 and 32. In the former case, negative and positive electrodes 20 and 30 may have the same size.

In the former case, during a battery reaction, lithium may precipitate from the positive active material 32 to lower the performance of a battery. Therefore, in some cases, the area of a positive electrode coated with a positive electrode active material may be smaller than the area of a negative electrode coated with a negative electrode active material so as to prevent the precipitation of lithium from the positive active material 32.

In the electrodes, the electrode collectors may be coated with the same amount or different amounts of the electrode active materials. In the latter case, the electrodes may have different thicknesses.

Each of the separators may be a multilayer film formed of a material having fine pores such as polyethylene, polypropylene, or a combination thereof. In another example, each of the separators may be a polymer film for a solid or gel-type polymer electrolyte, such as a polyvinylidenefluoride, a polyethylene oxide, a polyacrylonitrile, or a polyvinylidenefluoride-co-hexafluoropropylene film. In addition, each of the separators may include a ceramic material.

According to the embodiments of the invention, in the unit cells, negative and positive electrodes are alternately stacked with separators interposed therebetween. A negative electrode and a positive electrode may be stacked in a single unit cell (known as a mono-cell), or two negative or positive electrodes and one positive or negative electrode may be stacked in a single unit cell. That is, in the latter case, a positive electrode may be disposed between two negative electrodes in a single unit cell (known as a C-type bi-cell), or a negative electrode may be disposed between two positive electrodes in a single unit cell (known as an A-type bi-cell). The unit cells may include mono-cells, A-type bi-cells, C-type bi-cells, or combinations thereof.

According to other embodiments of the invention, in addition to the above-mentioned methods, laminations respectively including at least one positive electrode and at least one separator may be formed as unit cells, and the unit cells may be stacked to form an electrode stack (this method will now be referred to as a lamination and stacking method). That is, in embodiments of the invention, electrode stacks or electrode assemblies may be manufactured by the above-mentioned methods or the lamination and stacking method.

In the case that an electrode stack is formed using the lamination and stacking method, the structure of each unit cell of the electrode stack is not limited to a particular structure as long as each unit cell includes at least one positive electrode, at least one negative electrode, and at least one separator.

However, for a simple and economical manufacturing process, each unit cell of an electrode stack formed using the lamination and stacking method may have a basic structure of negative electrode/separator/positive electrode/separator or separator/negative electrode/separator/positive electrode. In certain embodiments, each unit cell may include one or more basic structures.

Furthermore, an electrode stack formed using the lamination and stacking method may only include electrode units having the above-mentioned basic structure or may include electrode units having the above-mentioned basic structure and other electrode units having a different structure(s).

Figure 11:
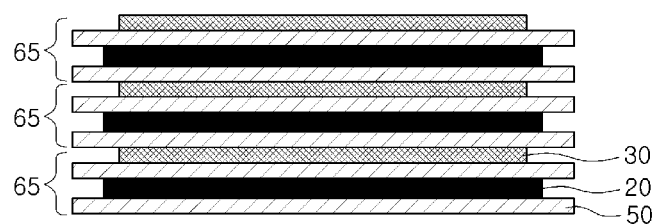
FIGS. 11 to 13 are schematic views illustrating exemplary laminated and stacked type unit cells used as unit cells according to embodiments of the invention.
Figure 12:
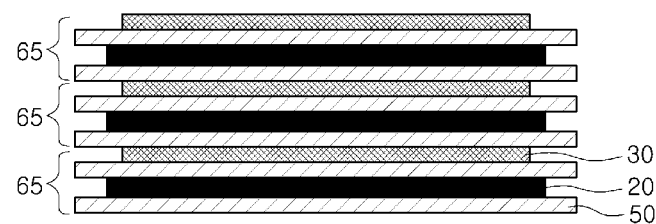
Figure 13:
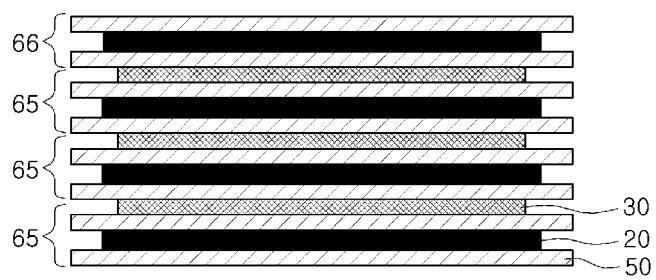

FIGS. 11 to 13 illustrate various examples of electrode stacks formed using a lamination and stacking method.

FIG. 11 illustrates an electrode stack including electrode units 65 formed using a lamination and stacking method. Each of the electrode units 65 has a basic structure of separator 50/negative electrode 20/separator 50/positive electrode 30. Instead of the basic structure of separator/negative electrode/separator/positive electrode illustrated in FIG. 11, each of the electrode units 65 may have a basic structure of separator/positive electrode/separator/negative electrode (the positions of negative and positive electrodes are changed). If the basic structure of an electrode unit is a separator/negative electrode/separator/positive electrode structure as illustrated in FIG. 11, the outermost (uppermost) positive electrode of the electrode stack formed of such electrode units may be not covered with a separator but may be exposed to the outside. In this case, the outermost positive electrode may be a single-side-coated positive electrode whose exposed side is not coated with an active material so as to optimize the capacity of a battery or the design of electrode units. Although each of the electrode units 65 illustrated in FIG. 11 has the same basic structure, the present invention is not limited thereto. For example, electrode units having two or more respective identical or different basic structures may be stacked to form an electrode stack.

FIG. 12 illustrates an electrode stack formed by stacking electrode units 66 having a basic structure of separator 50/negative electrode 20/separator 50/positive electrode 20 and an electrode unit having a basic structure of separator 50/negative electrode 20/separator 50. In FIG. 12, since the outermost (uppermost) electrode unit has a basic structure of separator 50/negative electrode 20/separator 50, a positive electrode may not be exposed, and the capacity of a battery may be increased. Similarly, in the case of an electrode stack having an exposed uppermost negative electrode, an electrode unit having a basic structure of separator/positive electrode/separator may be disposed on the exposed uppermost negative electrode to maximally utilize the capacity of the uppermost negative electrode.

FIG. 13 illustrates an electrode stack formed by stacking electrode units 68 having a basic structure of negative electrode 20/separator 50/positive electrode 30/separator 50 and an electrode unit 67 having a basic structure of negative electrode 20/separator 50/positive electrode 30/separator 50/negative electrode 20. In FIG. 13, since the outermost (uppermost) electrode unit has a basic structure of negative electrode 20/separator 50/positive electrode 30/separator 50/negative electrode 20, a positive electrode may not be exposed, and the capacity of a battery may be increased.

As illustrated in FIGS. 12 and 13, the electrode stacks formed using a lamination and stacking method include electrode units having the above-described basic structures. In addition to the electrode units, the electrode stacks may further include a single electrode, a single separator, or unit cells having different arrangements and structures. For example, after stacking electrode units having the above-described basic structures, a single electrode, a single-side-coated electrode, a separator, or a unit cell having a different arrangement and structure may be disposed on an outermost side or both the outermost sides of the stacked electrode units so as to cover an exposed positive electrode or increase the capacity of a battery. In the electrode stacks illustrated in FIGS. 12 and 13, the uppermost electrode units have structures different from those of the other electrode units. However, the present invention is not limited thereto. For example, the lowermost electrode unit of an electrode stack may have a structure different from the structure of the other electrode units of the electrode stack, or the uppermost and lowermost electrode units of an electrode stack may have a structure different from the structure of the other electrode units of the electrode stack.

According to embodiments of the invention, each unit cell may be formed by combining single electrodes as described above or folding a separator on which single electrodes or sub unit cells are arranged (stacked/folded type). In the latter case (stacked/folded type), a unit cell may be formed by preparing a rectangular separator which is sufficiently long to arrange two or more electrodes thereon, arranging one or more negative electrodes and one or more positive electrodes on the rectangular separator, and folding the rectangular separator in one direction (winding type); or a unit cell may be formed by alternately arranging one or more negative electrodes and one or more positive electrodes on a side or both sides of a rectangular separator and folding the rectangular separator one or more times in a zigzag manner (Z-folded type). In addition, a unit cell may be formed by placing negative and positive electrodes on both sides of a rectangular separator and rolling up the separator to have a spiral shape (jelly-roll type).

However, the present invention is not limited thereto. That is, any unit cell in which at least one negative electrode and at least one positive electrode are alternately stacked may be used in embodiments of the invention.

In embodiments of the invention, an electrode assembly may be formed by stacking unit cells having different areas so that the electrode assembly can have a stepped portion (hereinafter, an electrode assembly having a stepped portion(s) will also be referred to as a stepped electrode assembly). For example, referring to FIG. 1, unit cells in which positive electrodes 30 and negative electrodes 20 are alternately arranged are stacked so that a stepped portion can be formed between each two unit cells having different areas. In this manner, one or more stepped portions can be formed on an electrode assembly 1 according to the shape of a battery.

In embodiments of the invention, the number of stepped portions of an electrode assembly is not limited. For example, an electrode assembly having two stepped portions may be formed by stacking electrode stacks having three different areas. In another example, an electrode assembly having a single stepped portion may be formed by stacking electrode stacks having two different areas. In another example, an electrode assembly having three or more stepped portions may be formed. In the following description, electrode assemblies each having two stepped portions will mainly be described as non-limiting examples.

In an electrode assembly 1 having a stepped portion formed between two adjoining unit cells having different areas, the mutually-contacting electrodes of the two adjoining unit cells may have different polarities. In this case, a battery reaction can occur at the interface between the mutually-contacting electrodes to increase the capacity of a battery.

At this time, one of the mutually-contacting electrodes included in the relatively large unit cell may be a negative electrode 20. In detail, when two unit cells of an electrode assembly having different areas are in contact with each other with a separator interposed therebetween, the relatively large one of the two unit cells is partially exposed in a state in which the relatively large one is covered with the separator, and an electrode located on the partially exposed side of the relatively large unit cell may be a negative electrode 20. Since a positive electrode 30 is coated with a positive electrode active material 32 containing lithium, if the positive electrode 30 is exposed, lithium may precipitate from the exposed side of the positive electrode 30 to decrease the lifespan or stability of a battery.

Due to this reason, referring to FIG. 1, the uppermost and lowermost electrodes of the electrode assembly 1 formed by stacking unit cells may be negative electrodes 20. Alternatively, the uppermost and lowermost electrodes of the electrode assembly 1 may be positive electrodes 30. In this case, however, the exposed sides of the positive electrodes 30 may be not coated with a positive electrode active material 32. That is, the positive electrodes 30 may be single-side-coated electrodes 33.

As described above, electrode assemblies 1 of embodiments of the invention may be formed by stacking various unit cells. For example, as illustrated in FIG. 1, unit cells (stacked type unit cells) 51 each having a positive electrode 30, a separator 40, and a negative electrode 20 may be stacked to form an electrode assembly 1. In embodiments of the invention, stacked type unit cells stacked in an electrode assembly may be mono-cells as illustrated in FIG. 1, a combination of A-type bi-cells and C-type bi-cells, or a combination of mono-cells, A-type bi-cells, and C-type bi-cells. Alternatively, laminated and stacked type unit cells may be used instead of stacked type unit cells.

Figure 2:
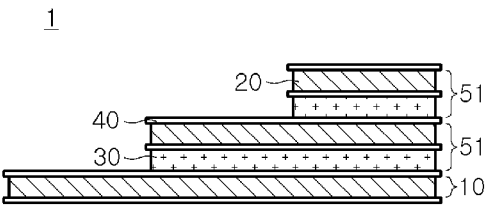
FIGS. 2 and 3 are schematic views illustrating the stepped and stacked structures of electrode assemblies including single electrodes, according to embodiments of the invention.
Figure 3:
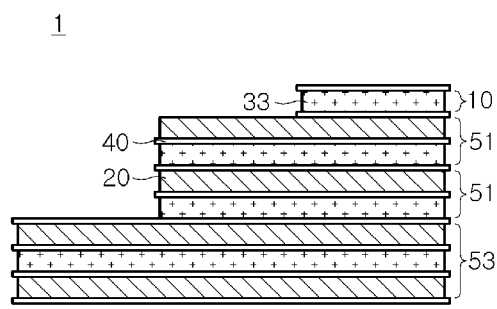

As illustrated in FIGS. 2 and 3, an electrode assembly 1 having stepped portions may include a single electrode 10. The single electrode 10 may be disposed on an outermost side of the electrode assembly 1. Referring to FIG. 2, a single negative electrode 10 is disposed on the lower side of an electrode assembly 1 to form a stepped portion together with an upper unit cell 51. In stead of that, a single positive electrode 10 may be disposed on the bottomed side of the electrode assembly 1. In this case, however, lithium may precipitate as described above.

Referring to FIG. 3, a single positive electrode 10 having a relatively small size is disposed on the upper side of an electrode assembly 1 to form a stepped portion together with a lower unit cell 51. In this case, the single positive electrode 10 may be a single-side-coated positive electrode, and the non-coated-side of the single positive electrode 10 may face outwards (upward).

In FIGS. 1 to 3, the single electrode 10 is disposed on the upper side or lower side of the electrode assembly 1. However, single electrodes 10 may be disposed on both the upper side and lower side of the electrode assembly 1 according to the stepped structure of the electrode assembly 1. For example, if the electrode assembly 1 has an inwardly decreasing width, single electrodes 10 may be disposed on both the upper side and lower side of the electrode assembly 1.

In certain embodiments, a single electrode 10 may be disposed in the middle of an electrode stack formed by stacking unit cells having the same areas. In this case, the single electrode 10 may not be distinguished from other electrodes of the unit cells and thus may be treated as a unit cell.

In embodiments of the invention, an electrode assembly 1 may has stepped portions formed by appropriately stacking stacked/folded type unit cells 61 and 62, jelly-roll type unit cells 63, or a combination thereof. Each of the folding type unit cells 61 and 62 may be formed by arranging single electrodes 10 or sub unit cells on a rectangular separator 40 and folding the rectangular separator 40. In this case, the rectangular separator 40 may be wound in one direction (a winding type, denoted by reference numeral 62) or folded in a zigzag manner (Z-folded type, denoted by reference numeral 61). The winding direction of the winding type unit cell 62 may be changed. For example, the winding type unit cell 62 may be formed by winding the rectangular separator 40 clockwise and then continuously winding the rectangular separator 40 counterclockwise.

Figure 4:
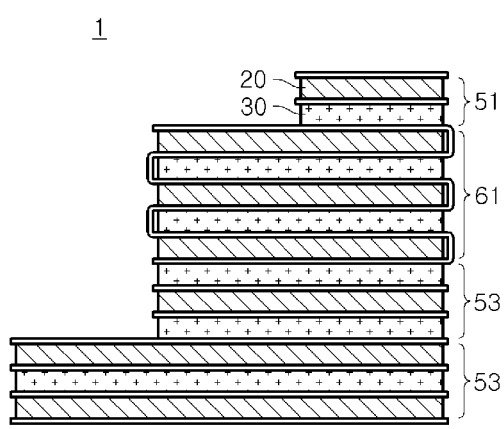
FIGS. 4 to 6 are schematic views illustrating the stepped and stacked structures of electrode assemblies in which stacked type unit cells and other unit cells are combined, according to embodiments of the invention.
Figure 5:
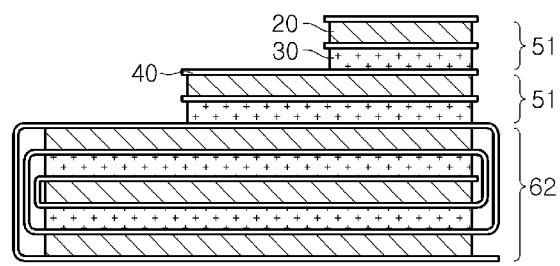
Figure 6:
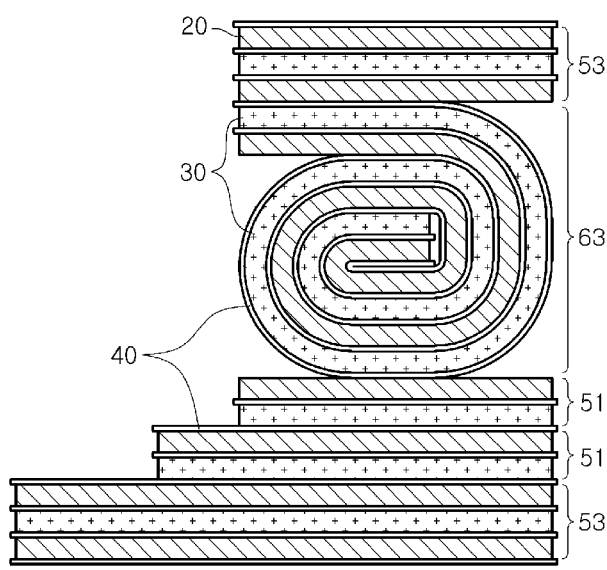

Examples thereof are illustrated in FIGS. 4 to 6. FIG. 4 illustrates an example of a stepped electrode assembly 1 formed by combining stacked type unit cells 53 and a stacked/folded type (Z-folded type) unit cell 61. FIG. 5 illustrates an example of a stepped electrode assembly 1 formed by combining stacked type unit cells 51 and a stacked/folded type (winding type) unit cell 62. FIG. 6 illustrates an example of a stepped electrode assembly 1 formed by combining stacked type unit cells 51 and 53 and a jell-roll type unit cell 63.

Figure 7:
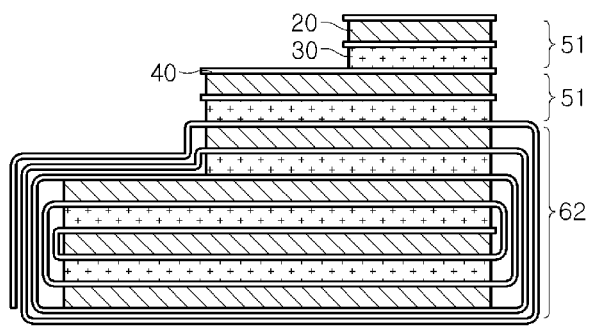
FIGS. 7 to 9 are schematic views illustrating the stepped and stacked structures of electrode assemblies in which stacked type unit cells and other stepped unit cells are combined, according to embodiments of the invention.
Figure 8:
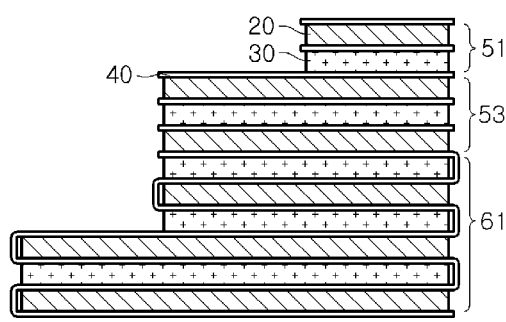
Figure 9:
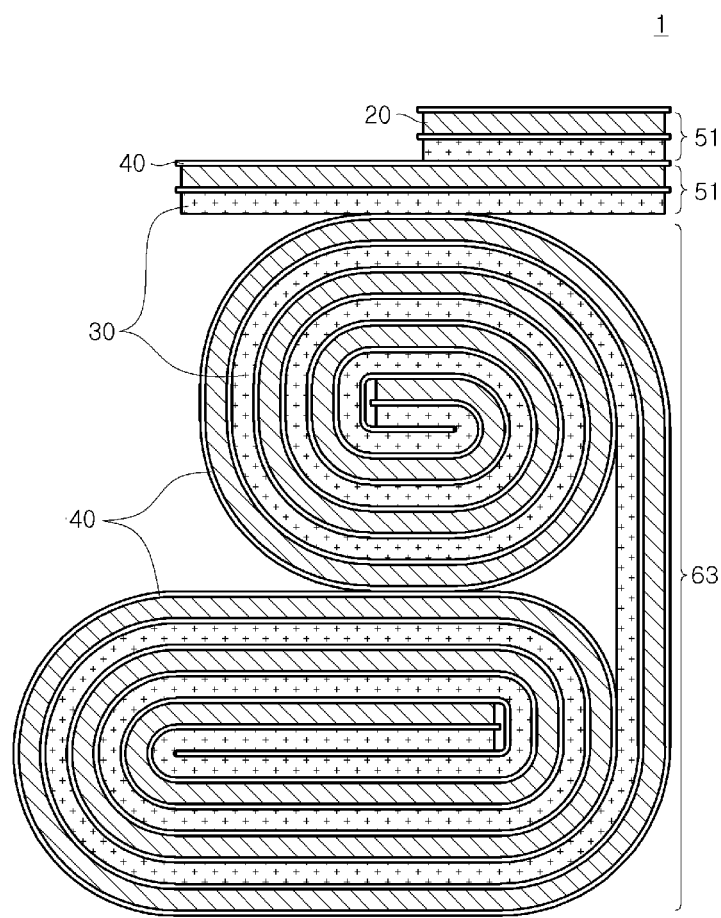

In certain embodiments of the invention, a stepped electrode assembly 1 may include a stepped stacked/folded type unit cell 61 or 62, a stepped jelly-roll type unit cell 63, or a combination thereof. Examples thereof are illustrated in FIGS. 7 to 9. FIG. 7 illustrates an example of a stepped electrode assembly 1 including stacked type unit cells 51 and a stepped stacked/folded type (winding type) unit cell 62. FIG. 8 illustrates an example of a stepped electrode assembly 1 including stacked type unit cells 51 and 53 and a stepped stacked/folded type (Z-folded type) unit cell 61. FIG. 9 illustrates an example of a stepped electrode assembly 1 including stacked type unit cells 51 and a stepped jelly-roll type unit cell 63.

In certain embodiments of the invention, a stepped electrode assembly 1 may include a single electrode 10. Positive and negative electrodes 30 and 20 of a stepped electrode assembly 1 may be alternately stacked as described above. However, in some cases, positive and negative electrodes 30 and 20 of a stepped electrode assembly 1 may not be alternately stacked, and positive electrodes 30 or negative electrodes 20 may face each other. In this case, a single electrode 10 having a different polarity may be disposed between the mutually-facing positive electrodes 30 or negative electrodes 20 so that positive and negative polarities can be alternated.

As described above, when unit cells having different areas are stacked to form a stacked portion, it may be preferable that a relatively large electrode of mutually-facing electrodes of the unit cells be a negative electrode 20. However, in some cases, the relatively large electrode of the mutually-facing electrodes may undesirably be a positive electrode 30. In this case, a single negative electrode 10 may be disposed on the relatively large electrode.

Figure 10:
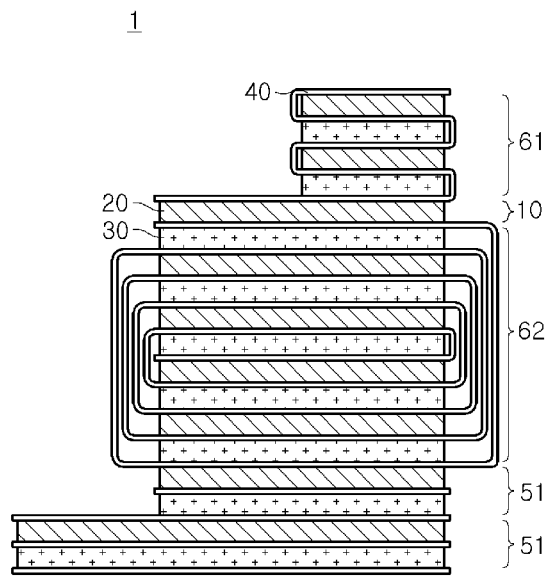
FIG. 10 is a schematic view illustrating the stepped and stacked structure of an electrode assembly in which stacked type unit cells, other unit cells, and a single electrode are combined, according to an embodiment of the invention.

An example thereof is illustrated in FIG. 10. FIG. 10 illustrates a stepped electrode assembly 1 including stacked type unit cells 51 and 53, stacked/folded type unit cells 61 and 62 (a winding type unit cell 62 and a Z-folded type unit cell 61), and a single electrode 10 disposed between the winding type unit cell 62 and the Z-folded type unit cell 61.

Figure 14A:
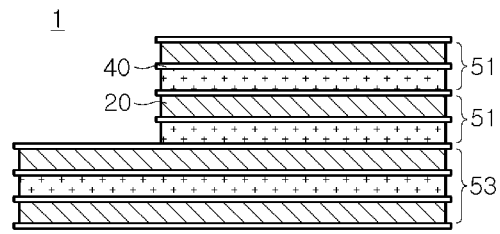
FIGS. 14A to 14C are schematic views illustrating exemplary electrode assemblies each having a single stepped portion according to embodiments of the invention.
Figure 14B:
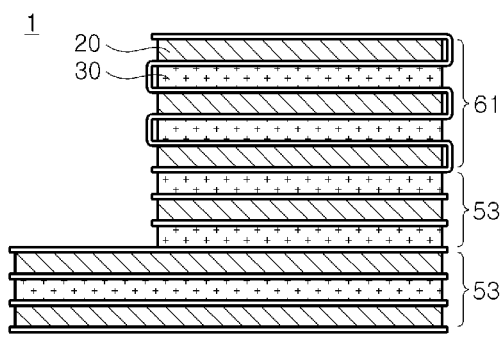
Figure 14C:
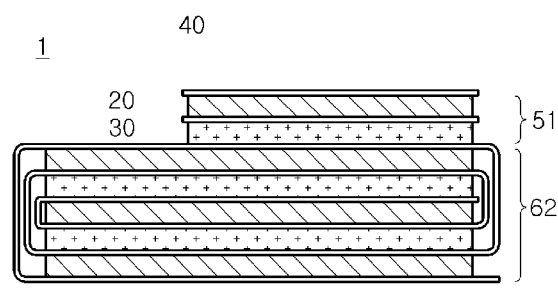

In the above description, electrode assemblies each having two stepped portions are described with reference to the accompanying drawings. However, an electrode assembly having a stepped portion may be formed by stacking two electrode stacks. Examples thereof are illustrated in FIGS. 14A to 14C.

Figure 15A:
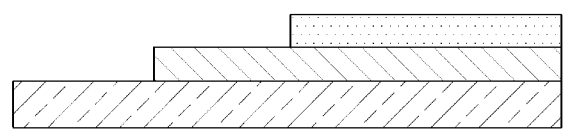
FIGS. 15A to 15C are schematic sectional views illustrating electrode assemblies having stepped portions according to embodiments of the invention.
Figure 15B:
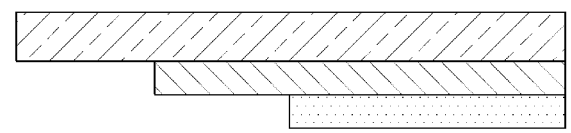
Figure 15C:
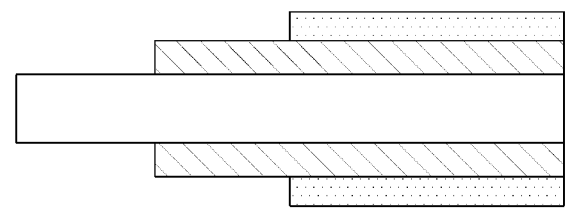

According to embodiments of the invention, electrode assemblies having various stack structures may be provided. FIGS. 15A to 15C are schematic cross-sectional views illustrating unit cell stack structures of electrode assemblies 1. As illustrated in FIGS. 15A to 15C, the sizes of unit cells stacked in an electrode assembly may decrease upwardly (FIG. 15A) or downward (FIG. 15B). In addition, the sizes of unit cells may increase and then decrease in a stacking direction or may decrease and then increase in a stacking direction. In this case, the unit cells may be symmetrically stacked. In other embodiments of the invention, the sizes of stacked unit cells may vary randomly.

Figure 16:
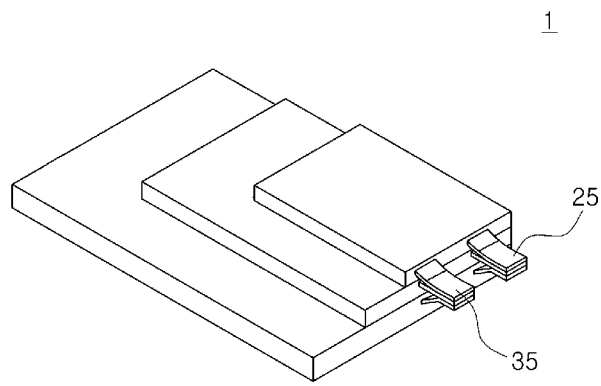
FIGS. 16 to 22 are perspective views illustrating battery cells having stepped portions according to embodiments of the invention.
Figure 17:
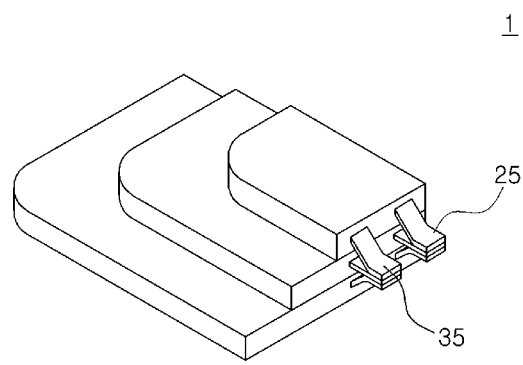

FIGS. 16 to 19 are perspective views illustrating exemplary electrode assemblies 1 each having unit cells stacked like the example shown in FIG. 15A. As illustrated in FIGS. 16 to 19, corners of unit cells of an electrode assembly 1 may be aligned in a line. In FIGS. 16 and 17, the electrode assemblies 1 are formed by stacking unit cells having the same shape but different areas.

The electrode assembly 1 shown in FIG. 16 includes unit cells having right-angled corners. The electrode assembly 1 shown in FIG. 17 includes unit cells each having right-angled corners and a curved corner. In certain embodiments, unit cells each having two or more curved corners may be stacked to form an electrode assembly, and the curved corners may have the same degree of curvature or different degrees of curvature.

Figure 18:
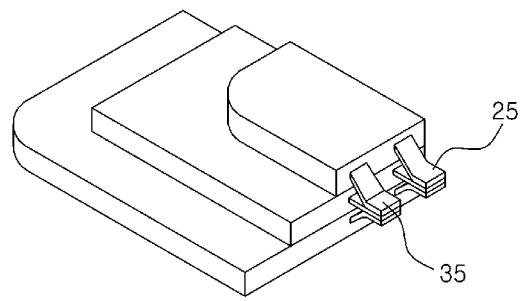
Figure 19:
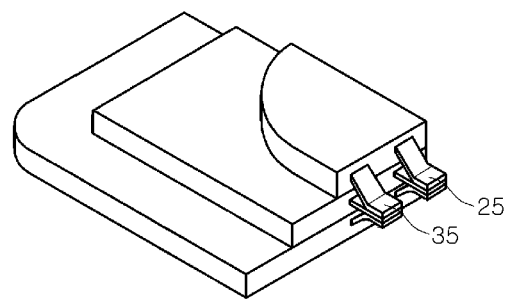

As illustrated in FIGS. 18 and 19, the corners of unit cells may have different shapes. For example, at least one of unit cells may have a curved corner as illustrated in FIG. 18, and the curved corners of unit cells may have different curvatures as illustrated in FIG. 19.

Figure 20:
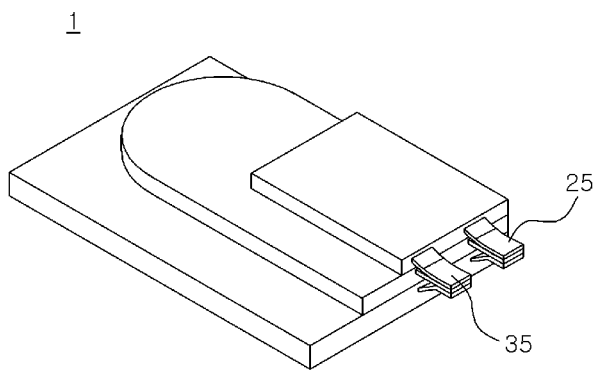

As illustrated in FIG. 20, neighboring corners and a side of a unit cell may form an arc shape. In other embodiments, a unit cell may have a shape in which a plurality of arcs or straight lines are connected.

Figure 24:
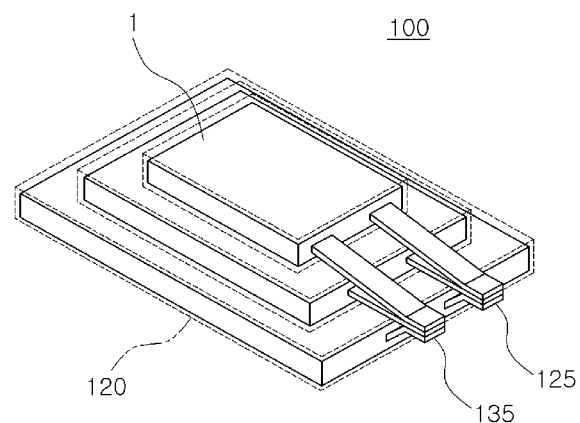
FIGS. 24 and 25 are schematic views illustrating pouch type secondary batteries (battery cells) including electrode assemblies according to embodiments of the invention.

In another embodiment illustrated in FIG. 24, a stepped electrode assembly 1 may be formed by stacking unit cells in a state in which the centers of the unit cells are aligned. In another embodiment, an electrode assembly may be formed by stacking unit cells in a manner such that a relatively small unit cell is within the boundary of a relatively large unit cell.

Figure 21:
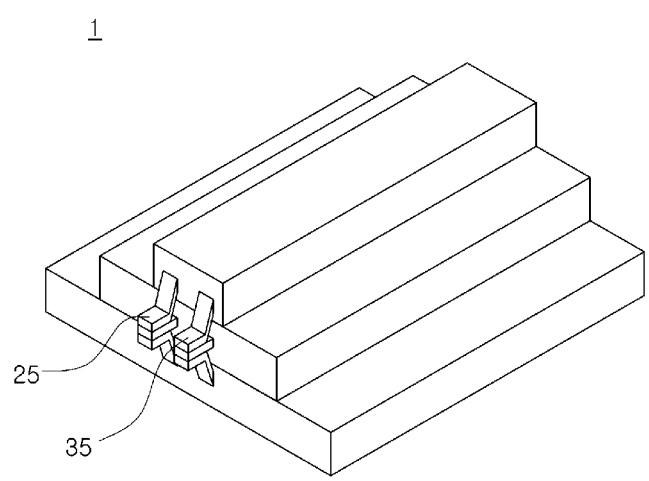

In addition, as illustrated in FIG. 21, an electrode assembly 1 having stepped portions in the width direction thereof may be formed by stacking unit cells having the same length but different widths. In this case, the stepped portions may be formed on a side or both sides in the width direction of the electrode assembly 1. In another embodiment illustrated in FIG. 22, an electrode assembly 1 may have stepped portions in the length direction thereof.

In the above-described electrode assemblies 1, unit cells are stacked in a manner such that a relatively small unit cell is within the boundary of a relatively large unit cell. However, unit cells may be stacked in a manner such that two neighboring unit cells are partially in contact with each other to form, for example, a cross (+) shape.

In addition to the corner shapes illustrated with reference to the drawings, unit cells having other corner shapes may be used. According to embodiments of the invention, such electrode assemblies 1 having various stacked structures, unit cell shapes, and corner shapes can be used to form batteries having various designs, and thus the internal spaces of devices using such batteries can be saved or efficiently used.

The unit cells of the electrode assemblies 1 include negative electrode tabs 25 and/or positive electrode tabs 35. The negative electrode tabs 25 are electrically connected to each other, and the positive electrode tabs 35 are electrically connected to each other. Even after the unit cells are inserted into a battery case, the electrode tabs having the same polarity maintain the electrically connected state.

The electrode tabs 25 and 35 may be attached to various positions. For example, the electrode tabs 25 and 35 may be attached to sides of electrodes, and electrode tabs having the same polarity may be connected in the same direction. For example, as illustrated in FIGS. 16 to 21 and 24, the electrode tabs 25 and 35 may protrude from a side of each of the electrode assemblies 1. In another example, the electrode tabs 25 and 35 may protrude from both lateral sides of the electrode assembly 1 as shown in FIG. 24.

In both the examples, the negative electrode tabs 25 may be superimposed on one another, and the positive electrode tabs 35 may be superimposed on one another, so that the negative electrode tabs 25 and the electrode tabs 25 and 35 can easily be electrically connected after the unit cells are inserted into a battery case 120 (refer to FIG. 24).

Figure 22:
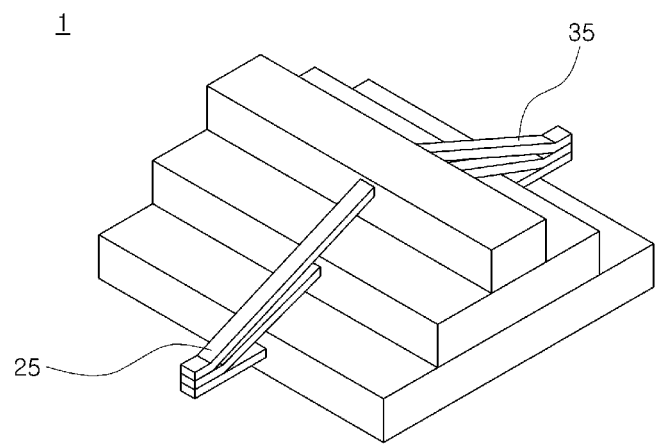

If the electrode tabs 25 and 35 are formed on stepped sides of the electrode assembly 1 as shown in FIG. 22 or 24, electrode tabs 25 and 35 protruding from a relatively small unit cell may make contact with an electrode of a relatively large unit cell, to deteriorate the stability of a battery. To prevent this, the electrode tabs 25 and 35 may be coated with an insulation resin or insulation tape.

Figure 23A:
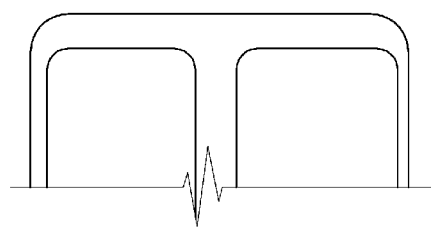
FIGS. 23A and 23B are a plan view and a front view illustrating the stacked structure of electrode taps according to an embodiment of the invention.
Figure 23B:
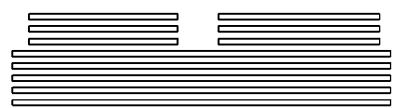

The shapes and sizes of the electrode tabs 25 and 35 are not limited. For example, the electrode tabs 25 and 35 may have the same width and length, or at least one of the electrode tabs 25 and 35 may have a different width and length. In this case, the electrode tabs 25 and 35 may easily be superimposed on one another by placing a relatively small electrode tab on a relatively large electrode tab. For example, if the electrode tabs 25 and 35 have different sizes, electrode tabs having the same polarity may be stacked on one another as shown in FIGS. 23A and 23B.

In certain embodiments, some or all of unit cells may be wrapped in at least one rectangular separator 40. In this case, the rectangular separator 40 may have an inclined portion between an upper edge of a relatively large unit cell 70 and an upper edge of a relatively small unit cell. Particularly, the rectangular separator 40 may have an inclined portion when the rectangular separator 40 is used to form a stacked/folded type (winding type) unit cell 61 having a stepped portion or used to wrap an electrode assembly 1 having a stepped portion.

In this case, an electrode case 120 used to accommodate an electrode assembly 1 may have an inclined portion corresponding to the inclined portion of the rectangular separator 40. However, this may increase the size of the electrode case 120. To prevent this, the rectangular separator 40 may be shaped according to the shape of an electrode assembly 1 for increasing the spatial efficiency of a battery. For example, if a portion of the rectangular separator 40 is spaced apart from an electrode or a lateral side of an electrode assembly 1, the portion of the rectangular separator 40 may be stretched by heating or pressing according to the shape of the electrode assembly 1. That is, the rectangular separator 40 may be bent or curved at a stepped portion of the electrode assembly 1. Alternatively, the rectangular separator 40 may be shaped according to the shape of an electrode assembly 1 by cutting the rectangular separator 40 along a stepped portion of the electrode assembly 1.

Figure 25:
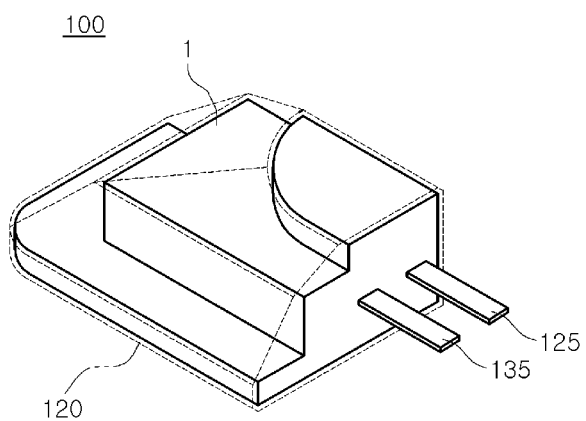

Next, battery cells will be described according to embodiments of the invention. FIGS. 24 and 25 illustrate examples of battery cells 100 according to embodiments of the invention. Referring to FIGS. 24 and 25, each of the battery cells 100 includes a battery case 120 and an electrode assembly 1 disposed in the battery case 120. The battery case 120 may be a pouch type case.

The pouch type case may be formed of a laminate sheet including an outer resin layer, a blocking metal layer for preventing permeation of foreign substances, and an inner sealing resin layer. However, the pouch type case is not limited thereto.

Electrode leads for connecting electrode terminals (tabs) of unit cells of the electrode assembly 1 may be exposed on the outer surface of the battery case 120, and insulation films (not shown) may be attached to the upper and lower sides of the electrode leads to protect the electrode leads.

In addition, the battery case 120 may have a shape corresponding to the shape of the electrode assembly 1. For example, the battery case 120 may be deformable into a desired shape. The shape and size of the battery case 120 may not be completely equal to the shape and size of the electrode assembly 1 so as to prevent a short circuit caused by slippage of the electrode assembly 1 in the battery case 120. However, the shape and size of the battery case 120 are not limited. That is, the shape and size of the battery case 120 may be varied according to, for example, application conditions.

For example, the battery case 120 may have a stepped shape according to the stepped shape of the electrode assembly 1 as shown in FIG. 24. In addition, as illustrated in FIG. 25, the battery case 120 may have inclined surfaces at positions facing stepped portions of the electrode assembly 1. For example, the battery case 120 may have inclined surfaces extending from upper edges and corners of the stepped portions of the electrode assembly 1. The inclined surfaces of the battery case 120 may include curved portions, and the slopes of the inclined surfaces may be 2 or greater.

The battery cells 100 may be lithium ion battery cells or lithium ion polymer battery cells. However, the battery cells 100 are not limited thereto.

The battery cells 100 may be used individually, or two or more such battery cells may be included in a battery pack. According to embodiments of the invention, such a battery cell and/or a battery pack may be used in various devices such as cellular phones, portable computers, smartphones, smartpads, net books, light electronic vehicles (LEVs), electric vehicles, hybrid electric vehicles, plug-in hybrid electric vehicles, and general power storage devices. Structures and construction methods of such devices are well known in the art to which the present invention pertains, and thus, descriptions thereof will be omitted.

When the battery cell or battery pack is placed in such a device, a system component of the device may be disposed in a space remained owing to the structure of the battery cell or battery pack. According to the embodiments of the invention, the battery cell or battery pack includes a stepped electrode assembly or stepped electrode assemblies having different sizes, and a battery case or battery cases of the battery cell or the battery pack are shaped according to the shape of the electrode assembly or electrode assemblies. Therefore, the space of a device using the battery cell or battery pack can be saved as compared with the case that the device using a prismatic or elliptical battery cell or battery pack of the related art.

A system component of the device may be disposed in the saved space. In this case, the system component and the battery cell or battery pack may flexibly be disposed in the device, and thus the space of the device can be efficiently used. Furthermore, the thickness or volume of the device can be reduced to make the device slim.

The invention claimed is:

1. An electrode assembly comprising a stack of unit cells, each of the unit cells comprising at least one negative electrode and at least one positive electrode, alternately stacked in a stacking direction,
   wherein at least one separator is located on each of both sides of the electrodes, and
   at least one of the unit cells has an area different from that of an adjacent one of the unit cells to define a first stepped portion of the electrode assembly,
   the electrode assembly further comprising at least one single electrode having negative or positive polarity, the single electrode disposed along an upper surface or a lower surface of the electrode assembly in the stacking direction, such that the single electrode is adjacent to a first one of the unit cells, and the single electrode having an area different from that of the first unit cell so as to define a second stepped portion of the electrode assembly.

2. The electrode assembly of claim 1, wherein the unit cells comprise at least one of a stacked/folded type unit cell, a jelly-roll type unit cell, a laminated and stacked type unit cell, and a combination thereof.

3. The electrode assembly of claim 2, wherein at least one negative electrode; least one positive electrode; a unit cell in which at least one positive electrode and at least one negative electrode are stacked with a separator interposed therebetween; or a combination thereof is arranged on at least one rectangular separator, and the stacked/folded type unit cell is formed by folding the at least one rectangular separator.

4. The electrode assembly of claim 2, wherein the stacked/folded type unit cell, the jelly-roll type unit cell, the laminated stacked type unit cell, or a combination thereof comprises the first stepped portion.

5. The electrode assembly of claim 1, wherein the at least one of the unit cells and the unit cell adjacent thereto have mutually-facing electrodes, and one of the mutually-facing electrodes having a relatively large area is a negative electrode.

6. The electrode assembly of claim 1, wherein the negative electrode has an active material coated area which is greater than an active material coated area of the positive electrode.

7. The electrode assembly of claim 1, wherein at least one of the electrodes located along the upper and lower surfaces of the electrode assembly in the stacking direction of the unit cells is a negative electrode or a single-side-coated positive electrode having a non-coated side facing outward.

8. The electrode assembly of claim 1, wherein the negative and positive electrodes comprise electrode tabs, respective and electrode tabs having the same polarity are electrically connected to each other.

9. The electrode assembly of claim 8, wherein the electrode tabs of the negative and positive electrodes are attached to the same side or different sides of the electrode assembly, and electrode tabs having the same polarity are attached to the same sides of the electrodes.

10. The electrode assembly of claim 8, wherein the electrode tabs have the same size or different sizes.

11. The electrode assembly of claim 1, wherein at least one of the unit cells has a corner shaped differently from the other corners thereof.

12. The electrode assembly of claim 1, wherein at least one of the unit cells has at least one curved corner.

13. The electrode assembly of claim 12, wherein the at least one of the unit cells has two or more curved corners, and the curved corners have the same curvature or different curvatures.

14. The electrode assembly of claim 12, wherein each of two or more of the unit cells has at least one curved corner, and at least one of the curved corners has a curvature different from that of the other curved corners.

15. The electrode assembly of claim 1, wherein at least one of neighboring electrodes of the electrode, assembly is disposed on an adjacent electrode thereof within a boundary of the neighboring electrode.

16. The electrode assembly of claim 1, wherein areas of the unit cells decrease in the stacking direction of the unit cells.

17. The electrode assembly of claim 1, wherein the unit cells are stacked in a manner such that corners of the unit cells are aligned in a line.

18. The electrode assembly of claim 1, wherein the unit cells are stacked in a manner such that centers of the unit cells are aligned in a line.

19. The electrode assembly of claim 1, wherein the unit cells have the same thickness or different thicknesses.

20. A battery cell comprising:
    the electrode assembly of claim 1; and
    a battery case accommodating the electrode assembly.

21. The battery cell of claim 20, wherein the battery case is a pouch type case.

22. The battery cell of claim 21, wherein the battery case has a stepped or inclined portion corresponding to a shape of the electrode assembly.

23. The battery cell of claim 20, wherein the battery cell is a lithium ion secondary battery cell or lithium ion polymer secondary battery cell.

24. A device comprising at least one battery cell as claimed in claim 20.

25. The device of claim 24, wherein a system component of the device is disposed in a remaining space of the battery cell.

26. The device of claim 24, wherein the device is a cellular phone, a portable computer, a smartphone, a smartpad, a net book, an light electronic vehicle (LEV), an electric vehicle, a hybrid electric vehicle, a plug-in hybrid electric vehicle, or a power storage device.

* * * * *